(12) United States Patent
Braun et al.

(10) Patent No.: US 8,899,657 B2
(45) Date of Patent: Dec. 2, 2014

(54) FOLDING TOP FOR A CONVERTIBLE

(71) Applicant: Dr. Inc. h.c. F. Porsche Aktiengesellschaft, Stuttgart (DE)

(72) Inventors: Wolfgang Braun, Albershausen (DE); Reiner Armbruster, Muehlacker (DE); Dirk Kroeger, Wallenhorst (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 13/710,818

(22) Filed: Dec. 11, 2012

(65) Prior Publication Data
US 2013/0161975 A1 Jun. 27, 2013

(30) Foreign Application Priority Data

Dec. 21, 2011 (DE) .......................... 10 2011 056 730

(51) Int. Cl.
*B60J 7/14* (2006.01)
*B60J 7/12* (2006.01)

(52) U.S. Cl.
CPC ................ *B60J 7/143* (2013.01); *B60J 7/1239* (2013.01); *B60J 7/1265* (2013.01)
USPC ....................................................... 296/108

(58) Field of Classification Search
CPC .......... B60J 7/1226; B60J 7/028; B60J 7/064; B60J 7/196; B60J 1/1823
USPC ........... 296/108, 107.16, 107.17, 116, 107.11
See application file for complete search history.

(56) References Cited

U.S. PATENT DOCUMENTS

| | | | |
|---|---|---|---|
| 6,343,829 B2 * | 2/2002 | Busch | 296/107.15 |
| 6,666,494 B2 * | 12/2003 | Antreich | 296/107.01 |
| 2008/0315633 A1 | 12/2008 | Antreich et al. | |

FOREIGN PATENT DOCUMENTS

| | | |
|---|---|---|
| DE | 10205935 A1 | 8/2003 |
| DE | 102005058921 A1 | 6/2007 |
| DE | 102007044943 B3 | 4/2009 |
| DE | 102009035190 A1 | 2/2011 |
| WO | WO03/086800 A1 | 10/2003 |

OTHER PUBLICATIONS

German Search Report, dated Aug. 23, 2012, with partial translation.

* cited by examiner

*Primary Examiner* — Joseph D Pape
*Assistant Examiner* — Dana Ivey
(74) *Attorney, Agent, or Firm* — RatnerPrestia

(57) ABSTRACT

A simplified folding-top linkage is distinguished in that the two roof-frame links are articulated directly on the two roof-frame portions, in that one of the roof-frame links has an extension, which is angled in relation to said roof-frame link and extends beyond a point of articulation located on the second roof-frame portion, and in that the drive link is articulated on the extension and the coupling link.

5 Claims, 1 Drawing Sheet

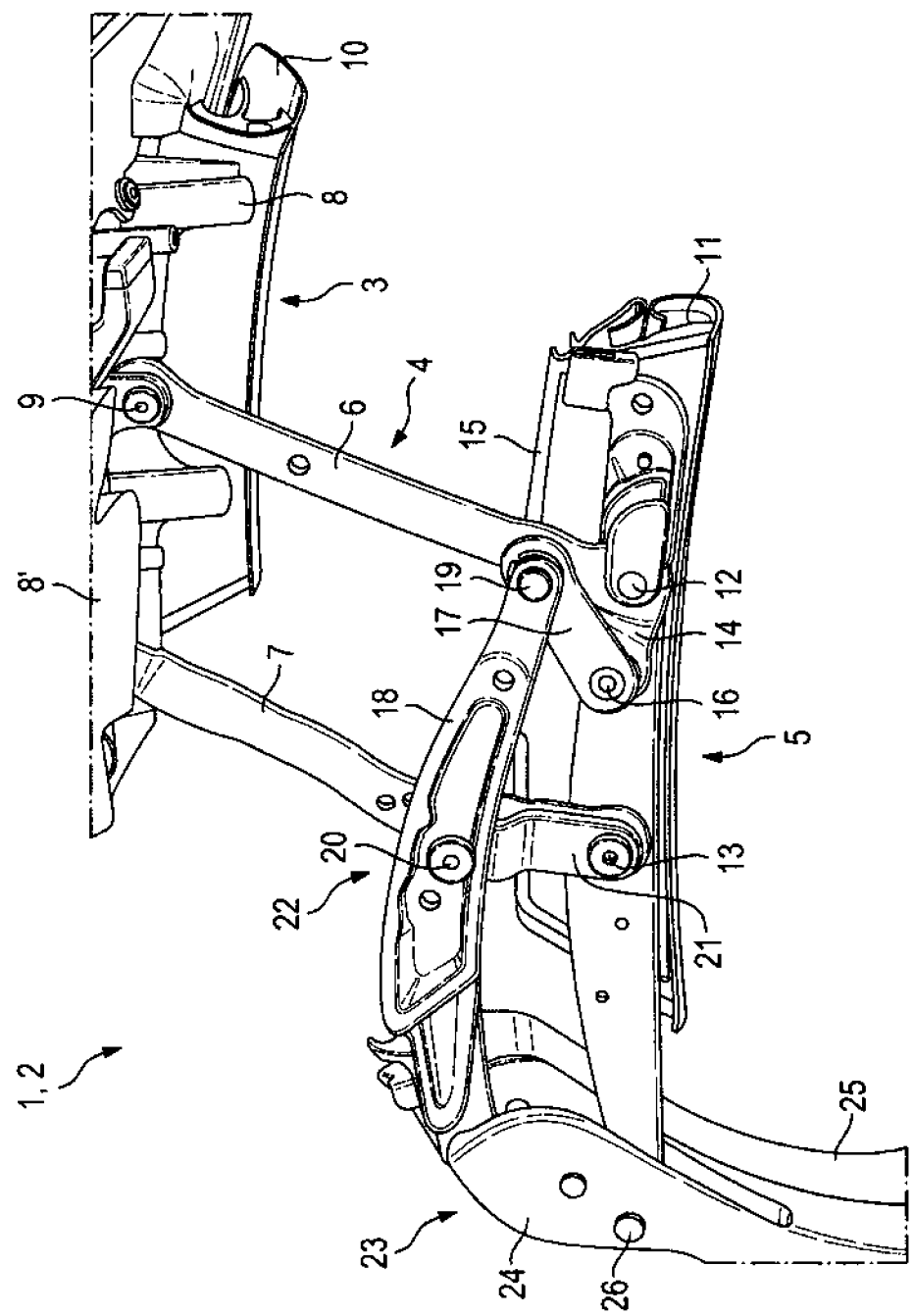

FOLDING TOP FOR A CONVERTIBLE

CROSS-REFERENCE TO RELATED APPLICATIONS

This application claims priority to German Patent Application No. 10 2011 056 730.5, filed Dec. 21, 2011, which is incorporated by reference herein in its entirety.

FIELD OF INVENTION

The invention proceeds from a folding top for a convertible having a lateral folding-top linkage, comprising a front, first roof-frame portion, a second roof-frame portion, which is located behind the first, a connecting-joint mechanism, between the two roof-frame portions, this mechanism comprising at least two roof-frame links, a main-joint mechanism, which has two main links and is intended for mounting the second roof-frame portion on a body of the convertible, and also a coupling linkage between the main-joint mechanism and the connecting-joint mechanism, wherein the coupling linkage has a coupling link, which is articulated on the main-joint mechanism parallel to the second roof-frame portion, a rear coupling element and a front drive link.

Such a folding top is known from DE 10 2007 044 943 B3, which is incorporated by reference herein. It has a lateral folding-top linkage constructed as follows: a front, first roof-frame portion and a second roof-frame portion, which is located behind the first, are connected to one another via a connecting-joint mechanism, which has at least two roof-frame links. The second roof-frame portion is articulated on the body of the convertible via a main-joint mechanism, which comprises two main links, and a folding-top bearing is provided for this purpose. A coupling linkage is arranged between the main-joint mechanism and the connecting-joint mechanism, and this coupling linkage has a coupling link, which is arranged essentially parallel to the second roof-frame portion and is articulated on the main-joint mechanism. The coupling linkage also has a rear coupling element, which is designed as an excentric and is connected to the coupling link and the rear roof-frame link of the connecting-joint mechanism. The coupling linkage additionally has a front drive link, which is connected to the coupling link. The folding-top linkage of the known folding top is of relatively complex configuration.

SUMMARY

It is therefore an object of the invention to specify a folding top of the type mentioned in the introduction of which the folding-top linkage is of more simple construction than in the prior art.

This object is achieved by a folding top for a convertible which has a lateral folding-top linkage, comprising a front, first roof-frame portion, a second roof-frame portion, which is located behind the first, a connecting-joint mechanism, between the two roof-frame portions, this mechanism comprising at least two roof-frame links, a main-joint mechanism, which has two main links and is intended for mounting the second roof-frame portion on a body of the convertible, and also a coupling linkage between the main-joint mechanism and the connecting-joint mechanism, wherein the coupling linkage has a coupling link, which is articulated on the main-joint mechanism parallel to the second roof-frame portion, a rear coupling element and a front drive link, wherein the two roof-frame links are articulated directly on the two roof-frame portions, in that one of the roof-frame links has an extension, which is angled in relation to said roof-frame link and extends beyond a point of articulation located on the second roof-frame portion, and in that the drive link is articulated on the extension and the coupling link. Developments of the invention form the subject matter of the dependent claims.

The folding top according to aspects of the invention operates with a relatively fewer links. It is therefore easier to assemble. The production costs are thus also reduced. Furthermore, the folding-top linkage according to aspects of the invention readily makes it possible to establish the desired movement sequence for the front roof-frame portion in relation to the rear roof-frame portion, this being done straightforwardly by adaptation of the length of the links of the connecting-joint mechanism and of the coupling linkage. The folding-top linkage according to aspects of the invention, which has the roof-frame link with the angled extension, also makes it possible to achieve a low packing height for the folding top in the stowage position. In addition, the force-transmission ratio can advantageously be established over the length of the extension. In particular it is thus also possible to optimize the drive of the folding top.

According to an advantageous development of the invention, it is provided that one of the roof-frame links forms a front link, and the other roof-frame link forms a rear link, of the connecting-joint mechanism, wherein it is provided, in particular, that the extension according to aspects of the invention is formed on the front roof-frame link.

Furthermore, a development provides for the coupling element of the coupling linkage to be designed as a guide link which is articulated, at one end, on the second roof-frame portion and, at the other end, on the coupling link. The guide link straightforwardly guides the movement of the coupling link.

A particularly compact construction of the folding-top linkage is achieved, in a development of the invention, in that the guide link and the roof-frame link are articulated on the second roof-frame portion at a common point of articulation.

A preferred development of the invention provides for the extension of the roof-frame link to run approximately at right angles to said roof-frame link. The length of the extension here is preferably such that, in the closed position of the folding top, the extension does not project beyond the second roof-frame portion.

According to a particularly preferred development of the invention, the main-joint mechanism is driven via a self-locking folding-top drive. The folding-top linkage according to aspects of the invention thus helps to achieve a folding top which need not be additionally secured against undesired movement in the stowage position. The transmission ratio of the links of the connecting-joint mechanism and of the coupling linkage in conjunction with the self-locking drive makes it possible for the folding top to be arrested passively in the stowage position. The folding-top linkage according to aspects of the invention transmits movement of the roof-frame portions directly to the self-locking drive, which, as result of the self-locking, prevents movement of the folding-top linkage more or less entirely.

The features which are disclosed and described in this application may be combined on their own and in any desired combination with any other of the features disclosed and described. This also applies to a feature which has been combined together with another described and/or disclosed feature.

BRIEF DESCRIPTION OF THE DRAWING

FIG. 1 is a perspective view of a folding convertible top according to the invention in an extended (open) position.

DETAILED DESCRIPTION

The single FIGURE shows a perspective view, in the form of a detail, of a folding top 1 for a convertible (not illustrated specifically here). The folding top 1 may be provided with a cover, although this is not illustrated here. The folding-top cover is preferably a flexible cover, and therefore the folding top 1, in a preferred embodiment, is realized as a so-called soft top. The FIGURE depicts the folding top 1 in a partially open position or a so-called intermediate position, which is arranged between a fully closed position (not illustrated here), in which the folding cover 1 covers over a passenger compartment of the convertible, and a fully stowed position, which is also referred to as the open position or stowage position.

Of the folding top 1, the FIGURE illustrates a perspective view, in the form of a detail, of part of a folding-top linkage 2 as seen from the passenger compartment. The linkage comprises a front or first roof-frame portion 3, which is also referred to as the summit of the roof and which, in the closed position of the folding top 1, abuts with locking action against an upper cowl of the windshield frame (not illustrated). The first roof-frame portion 3 is connected in a pivotable manner to a second roof-frame portion 5, which is arranged behind the first, via a connecting-joint mechanism 4, and therefore the two roof-frame portions can be moved relative to one another. The connecting-joint mechanism 4 has two roof-frame links 6 and 7, which have their upper ends, as seen in the FIGURE, connected in a pivotable manner to the first roof-frame portion 3. The roof-frame links 6, 7 here are connected to a carrier 8 of the front roof-frame portion 3 in bearing eyelets 9, wherein the bearing eyelet for the rear roof-frame link 7 is concealed by a covering 8' and therefore cannot be seen. The carrier 8 of the roof-frame portion 3 also has fitted on it a sealing strand 10, which interacts in sealing fashion with a side window (not shown) of the convertible when the folding top 1 assumes its closed position. In the same way, the second roof-frame portion 5 is provided with a further sealing strand 11. In the closed position of the folding top 1, the two sealing strands 10 and 11 are located in a row one behind the other, wherein the sealing strand 10 is located in front of the sealing strand 11.

The lower ends of the two roof-frame links 6 and 7, as seen in the FIGURE, are connected in a pivotable manner to the second roof-frame portion 5 in bearing eyelets 12, 13. It can be seen that the bearing eyelets 12, 13, which are also referred to as points of articulation, are spaced apart from one another along the roof frame 5. The same applies to the bearing eyelets 9, which are also referred to as points of articulation 9, on the first roof-frame portion 3. The connecting-joint mechanism 4 is thus designed as a four-bar mechanism and directly connects the front roof-frame portion 3 to the rear roof-frame portion 5, without any further links being connected therebetween.

In its lower end, as seen in the FIGURE, the front roof-frame mechanism 6 has an extension 14, which extends beyond the point of articulation 12. The extension 14 and that portion of the roof-frame link 6 which is located between the points of articulation 12 and 9 enclose an angle of approximately ninety degrees between them, wherein orientation is such that the extension 14 extends to the rear in the FIGURE. In the closed position of the folding top, the extension 14 would extend in approximately upright fashion. The length of the extension 14 here is such that, in the upright position, that is to say in the closed position of the folding top 1, it does not project beyond the upper periphery 15 of the roof frame or of the sealing strand 11. At its end which is directed away from the point of articulation 12, the extension 14 bears a further point of articulation 16, by means of which it is connected in a pivotable manner to one end of a drive link 17. At the other end of the drive link 17, a coupling link 18 is connected in a pivotable manner to the drive link 17 at a further point of articulation 19. At a spacing apart from the point of articulation 19, the coupling link 18 has a further point of articulation 20, via which the coupling link 18 is connected in a pivotable manner to a coupling element 21, which is designed as a guide link. The guide link or the coupling element 21 is also connected to the roof frame 5 at the point of articulation 13. The coupling link 18, coupling element 21 and drive link 17 are constituent parts of a coupling linkage 22, which connects the connecting-joint mechanism 4 in drive-specific terms to a main-joint mechanism 23 which belongs to the folding-top linkage 2 and will be explained in more detail hereinbelow. Via the main-joint mechanism 23, the second roof-frame portion 5 is connected in a pivotable manner to a folding-top bearing (not shown here) which is fastened to the body of the convertible. The main-joint mechanism 23 preferably comprises two main links, preferably in a four-bar arrangement, wherein just one main link 24 is illustrated. The main link 24 likewise forms a roof-frame portion and—like the other roof-frame portions 3, 5—bears a sealing strand 25, which, in the closed position of the folding top 1, is located in a row with the other sealing strands 10, 11. The second roof-frame portion 5 is attached in a pivotal manner to the main link 24 at a point of articulation 26.

The roof-frame portion 5 is also connected in a pivotal manner to the other main link (not illustrated here) of the main-joint mechanism 23, likewise at a point of articulation, although this cannot be seen. The coupling link 18 runs parallel to the rear roof frame 5 and is connected in a pivotal manner to the main link 24 likewise at a point of articulation, although this cannot be seen in the FIGURE.

A folding-top drive (not illustrated here) acts on the main-joint mechanism 23 and pivots the main-joint mechanism 23 about the folding-top bearing. The coupling linkage 22 introduces the pivoting movement of the main-joint mechanism 24 into the connecting-joint mechanism 4, and therefore the front roof-frame portion 3 is also moved along therewith. The folding-top drive (not shown here) is preferably designed as a self-locking drive and has, in particular, an electric motor and a self-locking gear mechanism, which is driven by the electric motor. A gear-mechanism output is connected to the main-joint mechanism, for example to the main link 24. Self-locking can preferably be achieved in that, for example, the rotor of the electric motor has a worm and the gear mechanism, on the input side, has a gearwheel, which meshes with the worm.

What is claimed:

1. A folding top for a convertible, having a lateral folding-top linkage, comprising a front, first roof-frame portion, a second roof-frame portion, which is located behind the first roof-frame portion, a connecting-joint mechanism, between the two roof-frame portions, the connecting joint mechanism comprising at least two roof-frame links, a main-joint mechanism, which has a main link, for mounting the second roof-frame portion on a body of the convertible, and also a coupling linkage between the main-joint mechanism and the connecting-joint mechanism, wherein the coupling linkage has a coupling link, which is articulated on the main-joint mechanism parallel to the second roof-frame portion, a rear coupling element and a front drive link, wherein each of the two roof-frame links is articulated directly to both of the two roof-frame portions via bearing eyelets, wherein one of the roof-frame links has an extension, which is angled in relation to said roof-frame link and extends beyond a point of articulation located on the second roof-frame portion, and wherein the front drive link is articulated on the extension and the coupling link.

2. The folding top as claimed in claim 1, wherein one of the roof-frame links forms a front link, and the other roof-frame link forms a rear link, of the connecting-joint mechanism, and in that the extension is formed on the front roof-frame link.

3. The folding top as claimed in claim 1, wherein the rear coupling element of the coupling linkage is designed as a guide link which is articulated on the second roof-frame portion and the coupling link.

4. The folding top as claimed in claim 1, wherein the guide link and the one roof-frame link, preferably the rear roof-frame link, are articulated on the second roof-frame portion at a common point of articulation.

5. The folding top as claimed in claim 1, wherein the extension runs approximately at a right angle to the roof-frame link.

\* \* \* \* \*